United States Patent Office 3,165,540
Patented Jan. 12, 1965

3,165,540
PROCESS FOR ISOLATION OF DIVERNOLIN AND TRIVERNOLIN
Charles F. Krewson, Abington, and Jesse S. Ard, Glenside, Pa., assignors to the United States of America as represented by the Secretary of Agriculture
No Drawing. Filed Sept. 5, 1961, Ser. No. 136,113
4 Claims. (Cl. 260—348)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a process for the isolation of epoxyglycerides, and particularly relates to the isolation of divernolin and trivernolin from a mixture containing these epoxyglycerides, other glycerides, and free fatty acids.

Fatty acids containing epoxy functions and glycerides of fatty acids containing epoxy functions are commercially important for use in plastics, surface coatings, etc. Heretofore a major source of these epoxy compounds has been the epoxidation of an oil containing unsaturated fatty acids, for example, soybean oil, or of unsaturated acids obtained from such an oil.

Plant species from families Compositae, Cruciferae, Euphorbiaceae, Malvacae, Onagraceae, Rosaceae and Tiliaceae have recently been shown to contain epoxy fatty acids in their seed oils as naturally occurring compounds. Specifically, *Vernonia anthelmintica* (Indian ironweed) from the Compositae family has yielded vernolic acid, identified as D (+)-cis-12,13-epoxy-cis-octadec-9-enoic acid. Oil content of the seeds of *Vernonia anthelmintica* is usually about 23–25%, in which two-thirds or more of the fatty acids are epoxy fatty acids. Although vernolic acid has been isolated and identified, its glycerides (trivernolin, divernolin, and monovernolin) have not to our knowledge been separated from the oil.

We have found that it is possible to separate divernolin and trivernolin from each other and from other glycerides and fat soluble material extracted from *Vernonia anthelmintica*. Monovernolin was not isolated and identified, and, if present, apparently occurs only in trace amounts.

In general, according to the present invention, a divernolin and trivernolin source material such as ground *Vernonia anthelmintica* seed or its seed oil, is heated with petroleum ether, preferably at a temperature above about 35° C., to obtain a first petroleum ether solution containing trivernolin and divernolin. The solution is separated from insoluble material, cooled to a temperature in the range of about from 0 to 10° C. and allowed to stand, whereupon divernolin precipitates and the divernolin is separated from the solution. The solution is cooled to a temperature in the range of about from —20 to —10° C. and allowed to stand, whereupon a mixture of trivernolin and vernolic acid precipitates. The mixture is separated from the first petroleum ether solution, then redissolved in fresh petroleum ether to give a second petroleum ether solution which is brought into contact successively with aqueous methanolic alkali solution and water to remove the vernolic acid as the alkali salt. The trivernolin is separated from the vernolic acid free second petroleum ether solution as by recrystallization at a temperature below —10° C. or by evaporating the petroleum ether.

In an alternative process for obtaining divernolin and trivernolin ground *Vernonia anthelmintica* seed is extracted with petroleum ether at about —15 to —20° C. to separate non-oxygenated fatty acids, their glycerides and unsaponifiable material from the marc. The marc is next extracted with petroleum ether at about 0 to 10° C. to separate trivernolin from the marc. This extract may also contain vernolic acid which is readily removed by treating the petroleum ether solution with aqueous methanolic sodium hydroxide (or other alkaline hydroxide), separating the aqueous layer containing vernolate salt, washing the petroleum ether layer, and separating the trivernolin from the petroleum ether.

Substantially all the divernolin is still in the marc, and it is separated by extraction with petroleum ether at about 35° C. The extract is cooled to below about 10° C. to precipitate the divernolin, which is separated as a white solid, melting at about 54–55° C. The divernolin may also be separated by distillation or evaporation of the petroleum ether solvent.

With divernolin and trivernolin available for solubility studies it now may be possible to devise processes employing other solvents for the extraction and precipitation procedures, but we prefer petroleum ether as it is a readily available solvent and gives good results in separating di- and tri-vernolin. Among petroleum ether fractions, that boiling in the range of about 60–70° C. (primarily hexane) is particularly useful, as the boiling point is high enough to rapidly dissolve divernolin, yet is easier to use in an extractor than higher boiling petroleum ethers. Lower boiling hydrocarbons such as pentanes or mixtures of pentane and hexane may also be used in the process.

As demonstrated in the examples the solubility of the epoxy glycerides in petroleum ether is primarily dependent upon temperature. The ratio of volume of petroleum ether to amount of epoxyglyceride used in the process may be varied over a wide range with excellent results in solution or precipitation of a particular epoxyglyceride under the specified temperature conditions.

While the precipitations (crystallizations) were carried out by allowing the mixture of solvent and precipitate to stand overnight, this is more a matter of convenience than necessity. Good yields can be obtained at the designated temperatures in much shorter times.

It should be understood that the precipitate of any glyceride material is rarely, if ever, a distinct chemical entity. Analytical data of the present products indicate that they are of sufficient purity for the terms divernolin and trivernolin to be appropriate and characteristic.

As typified in Example 3, oil containing divernolin and trivernolin, obtained from ironweed or other sources by any extraction or pressing operation, can be separated to obtain a mixture of the glycerides of these epoxy fatty acids or the mixture can be separated into quite highly purified fractions of the diepoxyglyceride and the triepoxyglyceride by precipitation in petroleum ether.

The following examples are presented in illustration of the practice of the present invention, but are not intended to be limitations thereof.

*Example 1*

Ground *Vernonia anthelmintica* seed, 1 kilogram (940 g. on a moisture-free basis), was extracted (20 days after grinding the seed) with two 4-liter portions of boiling petroleum ether (B.P. range 63–70° C.), heating each time for about one hour, then filtering the hot mixture. After the second extraction the marc was washed with warm petroleum ether to give a total filtrate of 9 liters, which was then concentrated at 40° with vacuum to 4 liters. This was cooled to about 10° C. and allowed to stand overnight at this temperature. The precipitate which formed (divernolin) was filtered off at 10° C. The filtrate was retained for subsequent separation of trivernolin. The collected precipitate was dissolved in 0.3 liter of warm (45–50° C.) petroleum ether, 1 gram each of activated carbon and filter aid stirred into the solution, and the mixture filtered while warm. The clear filtrate was cooled to about 10° C. and allowed to stand overnight to precipitate the divernolin. The precipitate was collected by filtering at 10° C. and recrystallized once more from 0.3 liter of petroleum ether to give divernolin, 12 g. dry weight, M.P. 55° C.

The filtrate retained for the separation of trivernolin (about 4 liters) was warmed, mixed with about 6 g. each of activated carbon, magnesium silicate (Florisil) and filter aid, and filtered. The clarified filtrate was allowed to stand overnight at −18° C. and the precipitate which formed was filtered off. The filter cake was dissolved in 4 liters of petroleum ether (B.P. 63–70° C.), the solution cooled to −18° C. and the precipitate collected. The filter cake was redissolved in petroleum ether as before and the solution mixed with 2 liters of aqueous methanolic sodium hydroxide (alkali content equivalent to the free acid as determined by preliminary analysis, methanol content about 60%). The petroleum ether layer was separated, washed with aqueous methanol and water, dried, filtered, cooled to −18° C. to precipitate the trivernolin (holding overnight at this temperature to insure maximum yield) and the trivernolin collected and dried. Yield: 28 g., M.P. 25° C.

The following example illustrates selective extraction of divernolin and trivernolin from seed.

Example 2

Three hundred grams of ground *Vernonia anthelmintica* seed were air-equilibrated for four days (6.4% moisture) and cooled to about −20° C. The cold seed was extracted three times at −18° C. with petroleum ether (B.P. 35–59° C. fraction), the first extraction with two liters and the others of one liter volume. These operations were performed at −18° C. Each extract was removed by vacuum filtration. These extracts contained chiefly non-oxygenated fatty acids and their glycerides and unsaponifiable materials.

The marc was warmed to a temperature of about 3° C. and extracted three times with one-liter portions of cold (3° C.) petroleum ether. Each extract was removed by vacuum filtration at about 10° C. The extracts were combined, shaken with alkaline aqueous alcohol solution to remove free fatty acids, and the petroleum ether layer separated and retained. The petroleum ether was allowed to stand overnight at −10° C. The precipitate which formed was separated and identified as trivernolin, 23.6 g.

The marc was then extracted successively with four 1-liter portions of warm (35° C.) petroleum ether. These four extracts were combined, concentrated to 0.2 liter, stirred at 35° C. with a small quantity of activated carbon, and filtered. The clear filtrate was cooled to about 3° C., a precipitate forming. The precipitate was collected at about 10° C. by filtration, washed with cold petroleum ether, and dried. The white crystalline solid, 6.4 grams, was identified as divernolin, M.P. 53.8–54.2° C.

The process of the present invention may be varied to give a mixture of epoxyglycerides, for use as a mixture or for separation into individual epoxyglycerides, as described in Example 3.

Example 3

*Vernonia anthelmintica* seed was ground and air-equilibrated to constant moisture. Twenty days after grinding 102 kilograms (96.1 kilograms on a moisture-free basis) was extracted using 833 liters of boiling petroleum ether (B.P. range 63–70° C.) for 2 hours with continuous recycling of the extract with a circulating pump. After an overnight standing at room temperature the batch was reheated and the clear extract pumped to an evaporator. The marc was washed three times with about 500-liter portions of warm petroleum ether, each wash being cycled for about 10 minutes before removal. The washes were combined with the original extract. Evaporation of the solvent produced 20.4 kilograms of oil, a 21.2% yield from the seed. The oil had an oxirane oxygen value of 3.57%, indicating a vernolic acid equivalent of 66.1%.

One-half (10.2 kilograms) of the oil was dissolved in 40 liters of petroleum ether (B.P. 63–70° C.). The solution was cooled to and held at −18° C. at the beginning, so that the precipitate contained both divernolin and trivernolin. After standing overnight the precipitate was collected at −18° C. The precipitate was redissolved in 24 liters of warm petroleum ether, then cooled and allowed to stand overnight at about 10° C. The precipitate (divernolin) was separated by filtration at 10° C., then clarified and purified by recrystallization as described in Example 1.

The dried purified divernolin weighed 547 grams, melted at 55° C., and appeared to be about 99% pure. Free fatty acid content, calculated as vernolic acid, was 0.15%. Oxirane oxygen: calculated, 4.931%; found, 4.882%. Wijs iodine number: calculated, 78.23; found, 78.6. Carbon: calculated, 72.18%; found, 72.0%. Hydrogen: calculated, 10.56%; found, 10.76%.

The filtrate from the 10° C. separation of divernolin, about 24 liters, was warmed with 80 grams each of activated carbon, magnesium silicate (Florisil) and filter aid. The mixture was stirred, filtered and the clarified filtrate cooled to −18° C. After standing overnight the precipitate was separated by vacuum filtration at −18° C. The precipitate was redissolved and the clarification process repeated. The free fatty acid content of the clarified petroleum ether solution was determined (56.6%) and one alkali equivalent to the free acid was added in 10.2 liters of aqueous methanolic sodium hydroxide (60% methanol). The petroleum ether containing the trivernolin readily separated from the alcoholic solution of sodium vernolate. The petroleum ether was cooled to −18° C. and held overnight. The precipitate was given an additional recrystallization at −18° C. and the product dried and analyzed.

The dried trivernolin weighed 1,275 grams, melted at 25° C. and had an indicated purity of 95.6%. Free fatty acid content, calculated as vernolic, was 0.07%. Oxirane oxygen: calculated, 5.176; found, 4.947. Iodine number: calculated, 82.1; found, 82.7.

We claim:

1. A process of isolating divernolin and trivernolin from a source material containing divernolin, trivernolin, vernolic acid, non-oxygenated fatty acids, the glycerides of said non-oxygenated fatty acids, and unsaponifiable material, and selected from the group consisting of ground *Vernonia anthelmintica* seed and *Vernonia anthelmintica* seed oil, comprising extracting said source material with petroleum ether at a temperature above about 35° C. to obtain a petroleum ether extract comprising a petroleum ether solution containing the divernolin, trivernolin, vernolic acid, non-oxygenated fatty acids, the glycerides of said non-oxygenated fatty acids, and the unsaponifiable material dissolved therein and insoluble material if the ground seed was used as the source material, separating the petroleum ether solution from any insoluble material, cooling the petroleum ether solution to a temperature in the range of about from 0° to 10° C. to precipitate the divernolin, isolating the precipitated divernolin from the petroleum ether solution, cooling the resulting divernolin-free petroleum ether solution to a temperature in the range of about from −20° to −10° C. to precipitate a mixture of the trivernolin and vernolic acid, separating the precipitated mixture of trivernolin and vernolic acid from the divernolin-free petroleum ether solution, the latter containing the non-oxygenated fatty acids, the glycerides of said non-oxygenated fatty acids, and the unsaponifiable material in solution therein, redissolving the precipitated mixture of trivernolin and vernolic acid in fresh petroleum ether, mixing aqueous methanolic alkali with the fresh petroleum ether solution containing the trivernolin and vernolic acid to form a petroleum ether layer containing the trivernolin dissolved therein and an aqueous layer containing the vernolic acid dissolved therein in the form of its water-soluble alkali metal salt, separating the petroleum ether layer from the aqueous layer, and isolating the trivernolin from the petroleum ether layer.

2. The process of claim 1 wherein the source material is ground *Vernonia anthelmintica* seed.

3. The process of claim 1 wherein the source material is *Vernonia anthelmintica* seed oil.

4. A process of isolating divernolin and trivernolin from a source material containing divernolin, trivernolin, vernolic acid, non-oxygenated fatty acids, the glycerides of said non-oxygenated fatty acids, an unsaponifiable material, and selected from the group consisting of ground *Vernonia anthelmintica* seed and *Vernonia anthelmintica* seed oil, comprising extracting said source material with petroleum ether at a temperature in the range of about from −20° to −15° C. to obtain a first petroleum ether extract consisting of an insoluble marc containing the divernolin, trivernolin, and vernolic acid, and a first petroleum ether solution containing the non-oxygenated fatty acids, the glycerides of said non-oxygenated fatty acids, and the unsaponifiable material dissolved therein, separating the insoluble marc from said first petroleum ether solution, extracting the marc with a second portion of petroleum ether at a temperature in the range of about from 0° to 10° C. to obtain a second petroleum ether extract consisting of a second insoluble marc containing the divernolin and a second petroleum ether solution containing the trivernolin and vernolic acid dissolved therein, separating the second insoluble marc containing the divernolin from the second petroleum ether solution containing the trivernolin and vernolic acid, extracting the second insoluble marc containing the divernolin with a third portion of petroleum ether at a temperature above about 35° C. to obtain a third petroleum ether extract consisting of a third insoluble marc and a third petroleum ether solution containing the divernolin dissolved therein, separating the third petroleum ether solution containing the divernolin from said third insoluble marc, isolating the divernolin from the third petroleum ether solution, mixing aqueous methanolic alkali with the second petroleum ether solution containing the trivernolin and vernolic acid dissolved therein to form a petroleum ether layer containing the trivernolin dissolved therein and an aqueous layer containing the vernolic acid dissolved therein in the form of its water-soluble alkali metal salt, separating the petroleum ether layer from the aqueous layer, and isolating the trivernolin from the petroleum ether layer.

References Cited in the file of this patent

UNITED STATES PATENTS

| | | |
|---|---|---|
| 2,459,820 | James | Jan. 25, 1949 |
| 2,614,111 | Ayers | Oct. 14, 1952 |
| 2,740,799 | Young et al. | Apr. 3, 1956 |
| 2,910,363 | Rubin et al. | Oct. 27, 1959 |

OTHER REFERENCES

Smith et al.; Journal of Org. Chem., Volume 25, pages 218–222, 1960.

The Condensed Chemical Dictionary, 5th Edition, 1956, p. 843.